United States Patent [19]

Catchpole

[11] 3,976,270

[45] Aug. 24, 1976

[54] DETECTION OF SURFACE ICE ACCRETION

[75] Inventor: Brian George Catchpole, Burwood, Australia

[73] Assignee: The Commonwealth of Australia, Australia

[22] Filed: July 22, 1975

[21] Appl. No.: 598,057

[30] Foreign Application Priority Data
Aug. 5, 1974  Australia.............................. 8400/74

[52] U.S. Cl.............................. 244/134 F; 73/17 R; 73/37; 416/95
[51] Int. Cl.² ....................................... B64D 15/20
[58] Field of Search......... 244/134 F, 134 R, 134 C; 60/39.09 D; 415/118; 416/39, 95; 137/832, 841; 73/17 R, 37; 343/704

[56] References Cited
UNITED STATES PATENTS
2,755,456  7/1956  Bursack...................... 244/134 F X Primary Examiner—Trygve M. Blix
Assistant Examiner—Barry L. Kelmachter
Attorney, Agent, or Firm—Lane, Aitken, Dunner & Ziems

[57] ABSTRACT

This specification discloses an ice accretion detector for aircraft comprising a sensing hole or port formed in part of the aircraft structure where icing is known to occur and connected to the key control port of a OR/NOR fluidic key and an air supply supplying air under pressure to the supply port of the key while a pneumatic indicator is connected to the output port of the key. When the sensing hole is closed by the formation of ice the fluidic key is switched into its other state and the pneumatic indicator senses this change and indicates the formation of ice.

5 Claims, 1 Drawing Figure

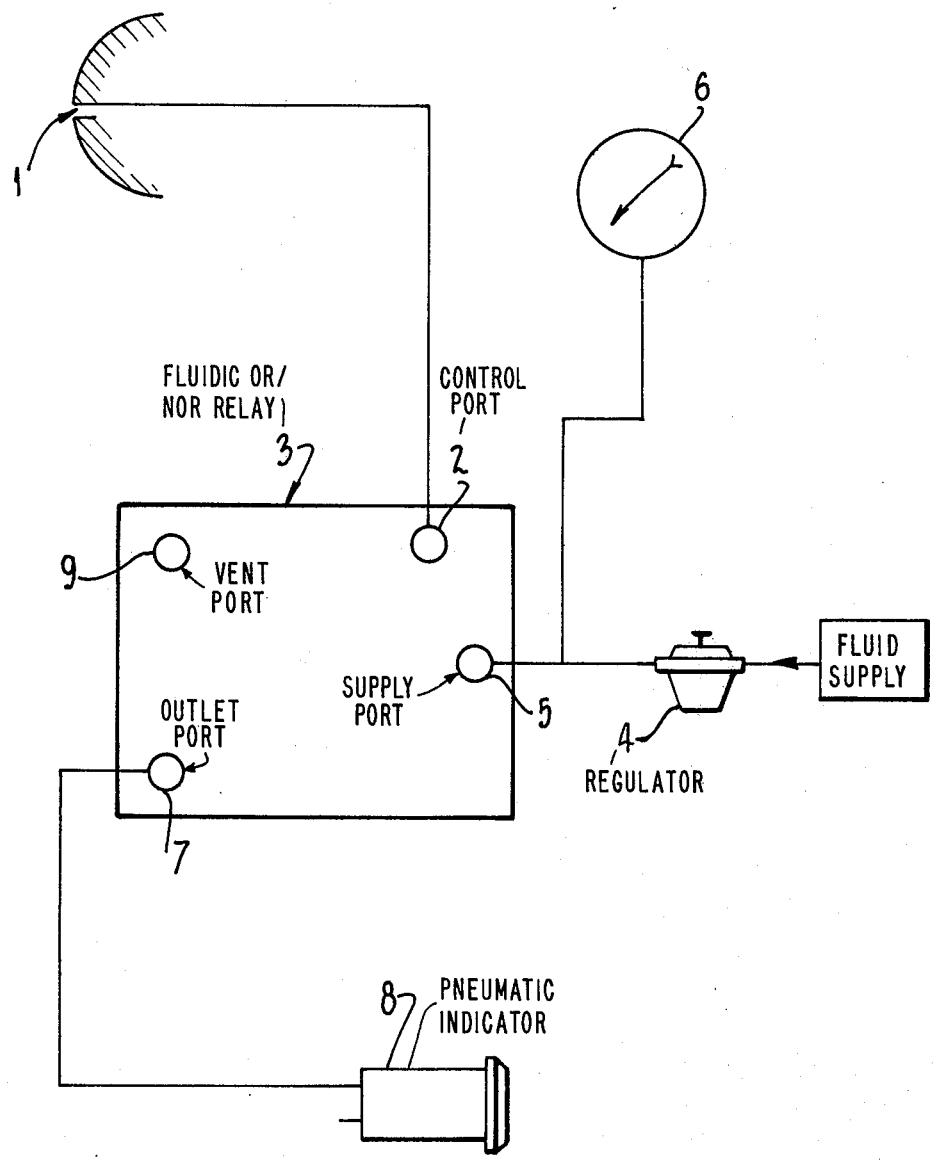

DETECTION OF SURFACE ICE ACCRETION

This invention relates to the detection of ice accretion on aircraft.

The use of devices to detect ice accretion on the various surfaces of aircraft is rare in Australia. Current practice is to require the pilot to monitor the outside air temperature and to activate anti-icing systems when the outside air temperature falls below a predetermined value (often about 2°C) in the presence of water, or where visible ice accretion occurs elsewhere on the aircraft.

Military aircraft, particularly those of high performance, are generally able to avoid icing conditions by fairly rapid changes in altitude but this may be neither possible nor desirable in the case of civil aircraft. In most cases the use of anti-icing systems, particularly those employing compressor bleed air, results in an appreciable loss of power and their activation at a predetermined temperature is unnecessarily conservative.

On the other hand, in those gas turbine engine installations in which the incoming air is accelerated, icing may occur first in the region of high velocity flow inside the intake, where the ice will not be visible to the pilot, while the outside air temperature is still several degrees above freezing. Engine installations like this occur typically in slow-flying, turbine powered, fixed-wing aircraft, and in helicopters. It is in this type of aircraft that the use of ice detection devices would be most advantageous.

The inventor is aware of three methods having been used on aircraft:

1. Ice Scraper

This uses the increase in driving torque when a rotating cutter encounters ice to activate an electrical switch. Used in Australia on the HS125 executive jet aircraft.

2. Ultrasonic Probe

This device senses the change in frequency of a probe, vibrating at ultrasonic frequency, due to the accretion of ice. Formerly used on Boeing 707–338 aircraft and currently used on F111.

3. Capacitance Probe

The change in capacitance of the probe due to the layer of ice is sensed electronically.

The inventor is also aware of literature describing an alternative detection system investigated by the National Advisory Committee for Aeronautics in the United States of America in which ice accretion is detected by small total pressure holes connected to a vented system and balanced against a non-vented ice free total pressure in a pressure differential switch. In this system a pressure differential occurs when the small holes plug with ice.

It is an object of the present invention to provide an ice detector for use on an aircraft which is less complicated and/or more reliable in operation than the prior art devices.

The invention provides an ice detector for use on an aircraft comprising a sensing port adapted to be located in a position where ice accretion is known to occur, means for passing fluid under pressure out through said port, means for sensing an increase in the pressure of the fluid signifying that the port is blocked by ice, and ice accretion indicator means adapted to be positioned inside the aircraft and activated by the sensing of said pressure increase.

The fluid supplied to the port is preferable air and the flow rate of the air is preferably controlled to prevent any de-icing effects due to the air flow itself.

A preferred form of the invention is shown schematically in the drawing.

The detector includes a sensing hole or port 1 which is formed in or mounted on a part of the aircraft structure where icing is known to occur. In tests carried out by the inventor, the sensing hole 1 was located in the stagnation region of the compressor front bearing housing, just upstream of the inlet guide vanes, a place in which accretion is known to occur under icing conditions.

The diameter of the sensing hole was nominally 1.8 mm (0.070 inch).

The sensing hole 1 is connected to the key control port 2 of a fluidic relay 3 while air under pressure from a suitable air supply is connected via a regulator 4 to the supply port 5 thereof. A pressure gauge 6 is connected to the air supply line as shown so that the pressure of the air supplied to the relay 3 can be determined. In the tests referred to above, a pressure of 7kPa (1psig) was found to be satisfactory. An output port 7 of the relay 3 is connected to a pneumatic indicator 8 while a vent port 9 is provided.

The fluidic relay 3 as shown in an OR/NOR key type B-105-A made by Bowles Engineering. This is a monostable relay that is switched by closing the key control port 2. In the present arrangement, in the key-control-port-open state, the air under pressure is applied to the indicator 8 to maintain this in an off condition. One suitable form of indicator is a Norgren Fluidic "Miniwink" Type 5VS-022.

When ice forms on the sensing hole 1 the blockage causes the relay 3 to switch and turn the pneumatic indicator 8 to on, providing a visible signal. This provides fail safe operation of the indicator although the indicator could still work if the roles played by the two states of the relay were reversed. In the tests, operation was consistent with temperature readings and with the first appearance of ice. As the intake air temperature was raised and lowered the detector signal turned off and on with no apparent hysteresis.

Although the system described above includes a fluidic relay and pneumatic indication, the basic principle involved is the pneumatic sensing of the blocking of the sensing hole. The signal amplification and alarm indication could of course be done by electronic or pneumatic means or by a hybrid system. Automatic operation of the anti-icing system could easily be arranged but it is probably desirable to retain this action at the discretion of the pilot in those cases where an appreciable performance penalty is associated with anti-icing operation.

To adapt the above system for flight use some filtration of the air would probably be required but in view of the very small air flow requirements this should present no difficulty. It is necessary to minimise the airflow through the sensing hole in order to eliminate any local de-icing effect due to the detector air flow itself. The use of multiple sensing points could easily be arranged for example, by the addition of a fluidic OR/NOR gate so that ice accretion at any one location would result in an alarm signal.

Compressor bleed air could be used as the air supply and the components mounted on, or close to, the engine to prevent freezing or condensation of atmospheric water in the lines. The supply pressure used in the inventor's tests was such that the detector hole was kept free of water even under tropical rain conditions. It was found that by the use of a slightly lower air flow the impact of water drops on the sensing hole could be detected by the flickering of the alarm signal. This may be a desirable feature under some circumstances.

In the case of an installation for a high performance aircraft where the intake duct stagnation pressure is well above ambient static it would be necessary to sense the pressure difference across the sensing hole by enclosing the relay in a container pressurised to the duct stagnation pressure. The pressure regulator supplying air to the relay would maintain the supply differential relative to this value. In this way performance of the fluidic detection circuit could be made independent of altitude and forward speed.

I claim:

1. An ice detector for use on an aircraft comprising a sensing port adapted to be located in a position where ice accretion is known to occur, means for passing fluid under pressure out through said port, means for sensing an increase in the pressure of the fluid signifying that the port is blocked by ice, and ice accretion indicator means adapted to be positioned inside the aircraft and activated by the sensing of said pressure increase.

2. The detector of claim 1, further comprising means for controlling the flow rate of the fluid below a rate at which de-icing effects occur in the sensing port.

3. The detector of claim 2, wherein the fluid is air.

4. An ice detector for use on an aircraft comprising a sensing port adapted to be located in a position where ice accretion is known to occur, a fluidic relay including a supply port, a control port, and an output port, said sensing port being connected to said control port, said supply port being adapted to be connected to a supply of fluid under pressure, said output port being connected to an indicator, said relay being in one state when said sensing and control ports are open, indicating no ice formation, and being in another state when said sensing and control ports are blocked, indicating ice formation, said indicator being actuated by the change from said one state to said another state to indicate ice formation.

5. The detector of claim 4, wherein said relay comprises an OR/NOR relay.

* * * * *